US 8,486,197 B2

(12) United States Patent
Takeshima et al.

(10) Patent No.: US 8,486,197 B2
(45) Date of Patent: Jul. 16, 2013

(54) METHOD OF SACCHARIFICATION AND SEPARATION FOR PLANT FIBER MATERIALS

(75) Inventors: Shinichi Takeshima, Numazu (JP); Takeshi Kikuchi, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 189 days.

(21) Appl. No.: 12/674,427

(22) PCT Filed: Aug. 29, 2008

(86) PCT No.: PCT/JP2008/065530
§ 371 (c)(1),
(2), (4) Date: Apr. 7, 2011

(87) PCT Pub. No.: WO2009/031469
PCT Pub. Date: Mar. 12, 2009

(65) Prior Publication Data
US 2011/0180062 A1    Jul. 28, 2011

(30) Foreign Application Priority Data

Sep. 5, 2007 (JP) ................................ 2007-230711

(51) Int. Cl.
*C13K 1/02* (2006.01)
(52) U.S. Cl.
USPC ......................................................... 127/37
(58) Field of Classification Search
USPC ......................................................... 127/37
See application file for complete search history.

(56) References Cited

U.S. PATENT DOCUMENTS

| | | | |
|---|---|---|---|
| 2,959,500 | A | 11/1960 | Schlapfer et al. |
| 3,652,425 | A | 3/1972 | Wilson |
| 4,237,110 | A | 12/1980 | Forster et al. |

(Continued)

FOREIGN PATENT DOCUMENTS

| | | |
|---|---|---|
| DE | 713610 | 11/1941 |
| EP | 1 860 201 A1 | 11/2007 |

(Continued)

OTHER PUBLICATIONS

G.-W. Wang et al., "Phosphotungstic Acid Catalyzed Amidation of Alcohols," Eur. J. Org. Chem., pp. 4367-4371 (2008).

(Continued)

*Primary Examiner* — Melvin C Mayes
*Assistant Examiner* — Colette Nguyen
(74) *Attorney, Agent, or Firm* — Finnegan, Henderson, Farabow, Garrett & Dunner, LLP

(57) ABSTRACT

A method of saccharification and separation for plant fiber materials is provided. The method includes hydrolyzing cellulose contained in the plant fiber materials using a cluster acid catalyst in a pseudo-molten state to produce saccharide. The method further includes a first separation step of separating a mixture containing an aqueous saccharide solution in which at least a portion of the saccharide produced is dissolved, a cluster acid organic solvent solution, and residues into a solid content containing the residues and a liquid content containing the aqueous saccharide solution and the cluster acid catalyst solvent solution. The method further includes a second separation step of dehydrating the liquid content by a dehydration means capable of absorbing water through chemical absorption to deposit the saccharide in the aqueous saccharide solution, and separating a solid content containing the saccharide from a liquid content containing the cluster acid catalyst and the organic solvent.

12 Claims, 3 Drawing Sheets

U.S. PATENT DOCUMENTS

| | | | |
|---|---|---|---|
| 4,743,669 | A | 5/1988 | Young |
| 5,380,341 | A | 1/1995 | Matthews et al. |
| 7,947,656 | B2 | 5/2011 | Yamasaki et al. |
| 2010/0126501 | A1 | 5/2010 | Takeshima et al. |
| 2010/0189706 | A1 | 7/2010 | Chang et al. |

FOREIGN PATENT DOCUMENTS

| | | |
|---|---|---|
| JP | 56-30334 A | 3/1981 |
| JP | 59-124901 | 7/1984 |
| JP | 61-118420 | 6/1986 |
| JP | 3-93755 | 4/1991 |
| JP | 04-226940 A | 8/1992 |
| JP | 7-41462 | 2/1995 |
| JP | 7-215900 | 8/1995 |
| JP | 8-299000 | 11/1996 |
| JP | 9-176206 | 7/1997 |
| JP | 10-137599 | 5/1998 |
| JP | 10-327900 | 12/1998 |
| JP | 11-240852 | 9/1999 |
| JP | 11-343301 | 12/1999 |
| JP | 2000-103758 A | 4/2000 |
| JP | 2002-59118 | 2/2002 |
| JP | 2002-85100 | 3/2002 |
| JP | 2004-241307 | 8/2004 |
| JP | 2004-256370 | 9/2004 |
| JP | 2006-129735 | 5/2006 |
| JP | 3802325 | 5/2006 |
| JP | 2006-149343 | 6/2006 |
| JP | 2006-206579 | 8/2006 |
| JP | 2007-104983 | 4/2007 |
| JP | 2008-271787 | 11/2008 |
| JP | 4240138 | 1/2009 |
| KR | 1996-0008643 | 6/1996 |
| WO | WO 95/26438 | 10/1995 |
| WO | WO 2006/011479 A1 | 2/2006 |
| WO | WO 2007/026817 A1 | 3/2007 |
| WO | WO2008/132605 * | 11/2008 |
| WO | WO 2008/132605 | 11/2008 |
| WO | WO 2008/132605 A1 | 11/2008 |

OTHER PUBLICATIONS

Decision of Refusal in Japanese Patent Appln. No. 2007-115407, dated May 17, 2011.
Notification of Reason(s) for Refusal in Japanese Patent Appin. No. 2007-115407, dated Aug. 23, 2011.
Makoto Misono, Unique acid catalysis of heteropoly compounds (heteropolyoxometalates) in the solid state, Chem. Commun., Jul. 7, 2001, No. 13 pp. 1141-1152.
Toru Nishimura, et al., High Catalytic Activities of Pseudoliquid Phase of Dodecatungstophosphoric Acid for Reactions of Polar Molecules, Chemistry Letters, 1991, pp. 1695-1698.
Makoto Misono, et al., Solid superacid catalysts, Chemtech, Nov. 1993, pp. 23-28.
Toko Kengaku, et al., Michael addition in the pseudoliquid phase of heteropoly compounds, Journal of molecular Catalysis A: Chemical 134, 1998, pp. 237-242.
Toshio Okuhara, et al., Catalysis by Heteropoly Compounds, Journal of Catalysis 93, 1985, pp. 224-230.
Office Action dated Jan. 9, 2012, for U.S. Appl. No. 12/597,176.
Reply to Office Action filed Jun. 9, 2011 in U.S. Appl. No. 12/597,176.
Office Action in U.S. Appl. No. 12/597,176; Mail Date: Mar. 10, 2011.
Notification of Reason(s) for Refusal dated Jan. 19, 2010 for Japanese Appl. No. JP 2008-145737.
Arai, K. et al., "Hydrolysis of Cellulose Fiber in the Presence of 12-Tungstosilicic Acid," Journal of Applied Polymer Science, 1985, vol. 30, p. 3051-3057 (1985).
Arai, K. et al., "Hydrolysis of Carbohydrates in the Presence of a Heteropolyacid, 1," "Hydrolysis of Sucrose in the Presence of 12-Tungstosilicic Acid," Makromol. Chem., Rapid Commun. 4, 181-185 (1983).
Notification of Transmittal of the International Search Report and The Written Opinion of the International Searching Authority, or the Declaration, for PCT/IB2009/005928, dated Aug. 24, 2009.
Notification of Transmittal of the International Search Report and The Written Opinion of the International Searching Authority, or the Declaration, for PCT/IB2009/005920, dated Aug. 24, 2009.
Notification of Reason(s) for Refusal dated Jan. 19, 2010 for Japanese Appl. No. JP 2008-145741.
C. Yow et al., "Hydrolysis of Palm Olein Catalyzed by Solid Heteropolyacids," Journal of the American Oil Chemists' Society, vol. 79, No. 4, pp. 357-361 (2002).
International Search Report in International Application No. PCT/IB2009/005880; Mailing Date: Jun. 1, 2010.
Written Opinion of the International Searching Authority in International Application No. PCT/IB2009/005880; Mailing Date: Jun. 1, 2010.
Notification of Reason(s) for Refusal in JP 2008-150380; Drafting Date: Apr. 27, 2010.
Tong-hao, W. et al., "The Synthesis and Characterization of Molybdophosphoric Acid with Dawson Structure," 1991.
Kozhevnikov, I., "Catalysis by Heteropoly Acids and Multicomponent Polyoxometalates in Liquid-Phase Reactions," Chem. Rev., vol. 98, 1998, pp. 171-198.
Piao, D., et al., "An efficient partial oxidation of methane in trifluoracetic acid using vanadium-containing heteropolyacid catalysts,", Journal of Organometallic Chemistry, vol. 574, 1999, pp. 116-120.
Written Opinion of the International Search Authority in International Application No. PCT/IB2009/005927, Mailing Date: Aug. 25, 2009.
Notification of Reason(s) for Refusal in JP 2008-145732; Drafting Date: Jan. 7, 2010.
International Search Report for PCT/IB2008/01528, Oct. 9, 2008.
Office Action mailed Jan. 20, 2011 for U.S. Appl. No. 12/597,176.
Takeshima et al., U.S. Appl. No. 12/159,176, filed Oct. 23, 2009.
Takeshima et al., U.S. Appl. No. 12/995,756, filed Dec. 2, 2010.
Takeshima et al., U.S. Appl. No. 12/995,809, filed Dec. 2, 2010.
Takeshima et al., U.S. Appl. No. 12/995,784, filed Dec. 2, 2010.
Office Action issued by the U.S. Patent and Trademark Office in patent U.S. Appl. No. 12/995,784, mailed Apr. 25, 2012.

* cited by examiner

METHOD OF SACCHARIFICATION AND SEPARATION FOR PLANT FIBER MATERIALS

CROSS-REFERENCE TO RELATED APPLICATIONS

This application is a national phase application of International Application No. PCT/JP2008/065530, filed Aug. 29, 2008, and claims the priority of Japanese Application No. 2007-230711, filed Sep. 5, 2007, the contents of both of which are incorporated herein by reference.

TECHNICAL FIELD

The present invention relates to a method of producing saccharide, most of which is glucose, by saccharification of plant fiber materials and separating the obtained saccharide.

BACKGROUND ART

Production of saccharide, most of which is glucose and xylose, from cellulose and/or hemicellulose by decomposing plant fibers being biomass, for example, sugar cane trash (bagasse), wood piece or the like, and efficient use of the obtained saccharide as food or fuel, are proposed and practically used. Particularly, the art, wherein the saccharide obtained by decomposing plant fibers is fermented to produce alcohol such as ethanol which serves as fuel, has received attention.

Several methods of producing saccharide such as glucose by separating cellulose and hemicellulose are conventionally proposed (for example, Patent Literatures 1 to 4). Examples of general methods include a method of hydrolyzing cellulose using sulfuric acid such as dilute sulfuric acid or concentrated sulfuric acid, or hydrochloric acid (Patent Literature 1 etc.), a method using cellulase enzyme (Patent Literature 2 etc.), a method using a solid catalyst such as an activated carbon or zeolite (Patent Literature 3 etc.) and a method using pressurized hot water (Patent Literature 4 etc.).

Patent Literature 1: Japanese Patent Application Laid-open (JP-A) No. 08-299000
Patent Literature 2: JP-A No. 2006-149343
Patent Literature 3: JP-A No. 2006-129735
Patent Literature 4: JP-A No. 2002-59118

SUMMARY OF INVENTION

Technical Problem

However, there is a problem that the separation of acid and saccharide in the method of decomposing cellulose using acid such as sulfuric acid is difficult. This is because both glucose which is a main component of decomposed products and acid are water-soluble. Removal of acid by neutralization or ion exchange requires great care and cost, and also total removal of acid is difficult. Thus, acid is likely to be left in a fermenting process of ethanol. Accordingly, even if pH is adjusted to appropriate pH for yeast activity in the fermenting process of ethanol, yeast activity is reduced due to increasing salt concentration, so that fermentation efficiency decreases.

Particularly, in the case of using concentrated sulfuric acid, it is extremely difficult to remove sulfuric acid to the extent that yeast is not deactivated, and a large amount of energy is required. On the other hand, in the case of using dilute sulfuric acid, it is relatively easy to remove sulfuric acid; however, it is necessary to decompose cellulose under high temperature condition, thereby energy is required.

Further, acid such as sulfuric acid or hydrochloric acid can be hardly separated, collected and reutilized. Thereby, using these acids as a catalyst of glucose production is one cause of cost increase of bioethanol.

Also, in the method using hot compressed water, the adjustment of condition, and the glucose production at stable yield are difficult. There is a concern that not only even decomposition of glucose occurs to decrease glucose yield but also yeast activity decreases due to the decomposed components to inhibit fermentation. In addition, there is a cost problem since a reactive device (supercritical device) is expensive and has low durability.

As a result of diligent researches regarding saccharification of cellulose, the inventors of the present invention have found that cluster acid in a pseudo-molten state has excellent catalyst activity against the hydrolysis of cellulose, and the cluster acid in the pseudo-molten state can be easily separated from produced saccharide, and a patent application has already filed as Japanese Patent Application No. 2007-115407. According to the present method, unlike the conventional concentrated sulfuric acid method and dilute sulfuric acid method, it is possible to collect and reutilize a hydrolysis catalyst, and energy efficiency of the processes from the hydrolysis of cellulose followed by the collection of an aqueous saccharide solution to the collection of a hydrolysis catalyst can be improved.

Also, in the above patent application, a method of separating the saccharide produced by the hydrolysis of the plant fiber materials from the cluster acid catalyst is proposed. Specifically, a method wherein after the hydrolysis, while cluster acid is dissolved by adding an organic solvent to a reactive mixture, which contains the produced saccharide, the cluster acid catalyst and residues, saccharide is separated from the cluster acid organic solvent together with residues as a solid content, is disclosed.

The inventors of the present invention have further advanced the research regarding saccharification of cellulose using the above cluster acid catalyst, and improved the separation efficiency of the saccharide to be produced from the cluster acid catalyst, thus a high-purity aqueous saccharide solution was successfully obtained. That is, the present invention has been achieved through the development of the above research, and is to provide a high-purity aqueous saccharide solution by increasing the collection rate of the above cluster acid which is the hydrolysis catalyst for cellulose.

Solution to Problem

A method of saccharification and separation for plant fiber materials of the present invention comprises:

a hydrolysis step of hydrolyzing cellulose contained in the plant fiber materials using a cluster acid catalyst in a pseudo-molten state to produce saccharide, most of which is glucose;

a first separation step of separating a mixture containing an aqueous saccharide solution in which at least a portion of the saccharide produced in the hydrolysis step is dissolved, a cluster acid organic solvent solution in which the cluster acid catalyst is dissolved, and residues into a solid content containing the residues and a liquid content containing the aqueous saccharide solution and the cluster acid organic solvent solution; and a second separation step of dehydrating the liquid content, which contains the aqueous saccharide solution and the cluster acid organic solvent solution and is separated in the first separation step, by a dehydration means capable of absorbing water through chemical absorption to deposit the saccharide in the aqueous saccharide solution, and separating a solid content containing the saccharide from a liquid content containing the cluster acid catalyst and the organic solvent.

The inventors of the present invention have found that when separating cluster acid used as a hydrolysis catalyst for cellulose from saccharide produced by the hydrolysis of cellulose by catalysis of the cluster acid, contamination of cluster acid into the saccharide obtained by separation can be prevented in such a manner that the cluster acid catalyst is dissolved in an organic solvent which is a poor solvent of saccharide, and at least a portion of the produced saccharide is dissolved in water to make the state in which these solutions (cluster acid organic solvent solution and aqueous saccharide solution) are mixed. According to the present invention, it is possible to increase the collection rate of the cluster acid catalyst and to obtain a high-purity saccharide. That is, according to the present invention, deactivation of yeast by contamination of impurities in alcohol fermentation can be prevented and the rate of reutilization of the cluster acid catalyst can be increased.

The cluster acid catalyst exhibits catalyst activity against a hydrolysis reaction of cellulose or hemicellulose by being into the pseudo-molten state. The pseudo-molten state of cluster acid varies by temperature and the amount of crystal water in the cluster acid catalyst; therefore, adjustment of the amount of crystal water in cluster acid and reaction temperature are required to make cluster acid be into the pseudo-molten state. On the other hand, water is required to hydrolyze cellulose being a polymer in which glucoses are β-1,4-glycosidically-linked into saccharide such as glucose and xylose.

From the above viewpoint, it is preferable that a moisture amount in a reacting system in the hydrolysis step is a total amount or more of (1) crystal water required for all the cluster acid catalyst in the reacting system to be in the pseudo-molten state under temperature condition of the hydrolysis step, and (2) water required for all the cellulose in the reacting system to be hydrolyzed to the glucose.

By setting the moisture amount in the reaction system in the hydrolysis step as the above amount, the cluster acid catalyst can be kept in the pseudo-molten state and catalyst activity can be maintained, even if moisture in the reacting system decreases due to being used for the hydrolysis of cellulose.

It is preferable that all the sugar produced from the cellulose is dissolved in the aqueous saccharide solution in the first separation step to increase the collection rate of the cluster acid catalyst and to obtain saccharide having higher purity.

The timing of adding water which dissolves saccharide to make the aqueous saccharide solution is not particularly limited. It is preferable that at least a portion of water constituting the aqueous saccharide solution is contained in the reacting system of the hydrolysis step, and particularly preferable that all water constituting the aqueous saccharide solution is contained in the reacting system in the hydrolysis step, since the dissolution efficiency of saccharide to be produced is high, and the mixing property of the plant fiber materials and the cluster acid catalyst in the hydrolysis step is enhanced.

The dehydration means in which water in the aqueous saccharide solution is absorbed through chemical absorption and the aqueous solution is dehydrated is not particularly limited. For example, addition of a desiccating agent can be exemplified. As a specific desiccating agent, a silica gel can be exemplified.

In the present invention, the hydrolysis step can be performed under relatively mild reactive condition, at 140° C. or less under ordinary pressure to 1 MPa, and has excellent energy efficiency.

Representative examples of the cluster acid catalyst include heteropolyacid.

From the viewpoint of separation efficiency of saccharide from cluster acid catalyst, solubility of the saccharide to the organic solvent which dissolves the cluster acid catalyst is preferably 0.6 g/100 ml or less. Specific examples of the organic solvent include at least one kind selected from ethers and alcohols.

In the case of using the desiccating agent as the dehydration means, the desiccating agent and the saccharide can be separated in such a way that after the solid content containing the desiccating agent together with the deposited saccharide is separated from the liquid content containing the cluster acid catalyst and the organic solvent in the second separation step, the present invention further comprises a third separation step of adding water to the solid content separated in the second separation step, and separating an aqueous saccharide solution in which the saccharide in the solid content is dissolved in the water from the desiccating agent.

Advantageous Effects of Invention

According to the present invention, in the separation of saccharide produced by the hydrolysis of plant fiber materials and cluster acid being a catalyst of the hydrolysis reaction, it is possible to increase the collection rate of the cluster acid catalyst and to obtain high-purity saccharide. Accordingly, decrease of yeast activity due to contamination of cluster acid in alcohol fermentation can be prevented, and the rate of reutilization of the cluster acid catalyst can be increased.

DESCRIPTION OF EMBODIMENTS

Figure 1:
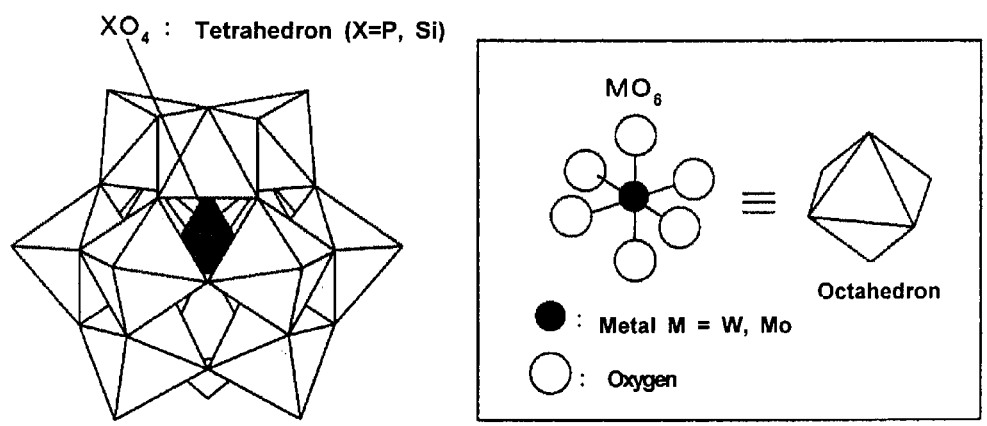
FIG. 1 is a view showing a Keggin structure of heteropolyacid.

A method of saccharification and separation for plant fiber materials of the present invention comprises:

a hydrolysis step of hydrolyzing cellulose contained in the plant fiber materials using a cluster acid catalyst in a pseudo-molten state to produce saccharide, most of which is glucose;

a first separation step of separating a mixture containing an aqueous saccharide solution in which at least a portion of the saccharide produced in the hydrolysis step is dissolved, a cluster acid organic solvent solution in which the cluster acid catalyst is dissolved, and residues into a solid content containing the residues and a liquid content containing the aqueous saccharide solution and the cluster acid organic solvent solution; and a second separation step of dehydrating the liquid content, which contains the aqueous saccharide solution and the cluster acid organic solvent solution and is separated in the first separation step, by a dehydration means capable of absorbing water through chemical absorption to deposit the saccharide in the aqueous saccharide solution, and separating a solid content containing the saccharide from a liquid content containing the cluster acid catalyst and the organic solvent.

In the above patent application (Japanese Patent Application No. 2007-115407), the inventors of the present invention have found that both saccharide, most of which is glucose, and cluster acid are soluble in water, but the cluster acid exhibits solubility to an organic solvent, to which saccharide is hardly-soluble or insoluble, and have reported that the cluster acid and the saccharide can be separated by utilizing the difference of the above solubility properties. That is, after hydrolyzing plant fiber materials using the cluster acid catalyst, the above specified organic solvent is added to a hydrolyzed mixture containing the saccharide being a product, the cluster acid catalyst, and residues such as unreacted cellulose (hereinafter, it may be simply referred to as a hydrolyzed mixture), thereby the cluster acid catalyst is dissolved in the organic solvent. On the other hand, the saccharide is not soluble in the organic solvent, therefore, the saccharide which is present in the solid state in the hydrolyzed mixture is not dissolved in the organic solvent, and can be separated from the cluster acid organic solvent solution by a solid-liquid separation method such as filtration.

As a result of further diligent researches, the inventors of the present invention have found that saccharide is contaminated by the cluster acid catalyst in the process that the saccharide produced in the hydrolysis step is deposited and grown as a crystal, or when the saccharide produced in the hydrolysis step is deposited and aggregates with other deposited saccharide.

Then, the saccharide in the hydrolyzed mixture is once dissolved in water, and the cluster acid catalyst in the hydrolyzed mixture is dissolved in the organic solvent to make the state in which the aqueous saccharide solution and the cluster acid organic solvent solution are mixed. Then, the mixture is dehydrated with leaving the organic solvent; thereby only saccharide is successfully deposited with the cluster acid catalyst dissolved in the organic solvent.

That is, the inventors of the present invention have found that the saccharide can be highly purified and the collection rate of the cluster acid catalyst can be increased by the aqueous saccharide solution in which at least a portion of the saccharide is dissolved in water and the cluster acid organic solvent solution in which the cluster acid catalyst is dissolved in the organic solvent coexisting to improve separation efficiency of the saccharide and the cluster acid catalyst when separating the saccharide produced by the hydrolysis of the plant fiber materials from the cluster acid used as the catalyst in the hydrolysis.

Furthermore, according to the method of saccharification and separation of the present invention, a caramel component (or it may be referred to as a blackened product) containing organic acid generated by over reaction, and lignin in the hydrolysis step can be separated from saccharide; thereby, the saccharide can be much further purified and the efficiency of alcohol fermentation can be highly enhanced.

In the method of saccharification and separation of the present invention, in the first separation step, if a portion of the saccharide produced in the hydrolysis step is dissolved in the aqueous saccharide solution, it is possible to increase the collection rate of the cluster acid compared with the conventional method. However, it is preferable that all the saccharide produced by the hydrolysis of the cellulose is dissolved in the aqueous saccharide solution due to high separation efficiency of the cluster acid catalyst and the saccharide.

In the first separation step in which a liquid content containing the aqueous saccharide solution and the cluster acid organic solvent solution and a solid content containing the residues are separated from a mixture containing the aqueous saccharide solution, the cluster acid organic solvent solution and the residues, if the aqueous saccharide solution and the cluster acid organic solvent solution are mixed, each timing of adding water in the aqueous saccharide solution and an organic solvent in the cluster acid organic solvent solution is not particularly limited. For example, they may be added in the reacting system together with the plant fiber materials and the cluster acid catalyst upon the hydrolysis step, or upon the first separating step. Alternatively, they may be added separately upon the hydrolysis step and the first separating step.

Hereinafter, the timing of adding the water and the organic solvent will be explained while explaining steps including from the hydrolysis step of the cellulose to the above first separation step in the method of saccharification and separation of the present invention.

Firstly, a hydrolysis step, in which cellulose contained in plant fiber materials is hydrolyzed to produce saccharide, most of which is glucose, will be explained.

Herein, the step of mostly producing glucose from cellulose is mainly explained; however, the plant fiber materials include hemicellulose other than cellulose, and the product includes xylose other than glucose. These cases are also in the range of the present invention.

The plant fiber materials are not particularly limited if they include cellulose or hemicellulose. The examples include cellulosic biomass such as a broad-leaved plant, a bamboo plant, a needle-leaved plant, kenaf, scrap wood of furniture, rice straw, wheat straw, rice husk, bagasse and sugar cane trash. Also, the plant fiber materials may be cellulose or hemicelluloses separated from the biomass, or artificially-synthesized cellulose or hemicelluloses itself.

From the viewpoint of dispersibility in the reacting system, the above fiber materials are generally used in the powdered state. A method of making the fiber materials in the powdered state may be based on a general method. From the viewpoint of mixing property with the cluster acid catalyst and improvement of reaction opportunity, it is preferable to make the fiber materials be in the powdered state having a diameter from a few μm to about 200 μm.

In the present invention, the cluster acid used as the catalyst of the hydrolysis of the plant fiber materials is an acid in which several oxo acids are condensed, that is, so-called polyacid. Many of polyacids are in the state of being oxidized to the maximum oxidation number since several oxygen atoms are bound to a center element, which exhibit excellent property as an oxidation catalyst, and are also known as strong acid. For example, acid strength of phosphotungstic acid (pKa=−13.16) being heteropolyacid is stronger than that of sulfuric acid (pKa=−11.93). That is, for example, even under the mild condition like 50° C., cellulose or hemicellulose can be decomposed to monosaccharide such as glucose or xylose.

The cluster acid used in the present invention may be either homopolyacid or heteropolyacid. However, the heteropolyacid is preferable due to high oxidizability and high acid strength. The heteropolyacid is not particularly limited, and the heteropolyacid represented by the formula of $H_wA_xB_yO_z$ (A: hetero atom; B: poly atom which can be a skeleton of polyacid; w: ratio of hydrogen atom; x: ratio of hetero atom; y: ratio of poly atom; and z: ratio of oxygen atom) can be exemplified. Examples of the poly atom B include atoms such as W, Mo, V and Nb, which can form polyacid. Examples of the hetero atom A include atoms such as P, Si, Ge, As and B, which can form heteropolyacid. The poly atom and hetero atom contained in the heteropolyacid molecule may be one kind or two or more kinds.

From the viewpoint of a balance between high acid strength and oxidizability, phosphotungstic acid ($H_3[PW_{12}O_{40}]$) and silicotungstic acid ($H_4[SiW_{12}O_{40}]$) being tungstate are preferable. Secondly, phosphomolybdic acid ($H_3[PMo_{12}O_{40}]$) being a salt of molybdate or the like can be suitably used.

Herein, the structure of Keggin type ($X^{n+}M_{12}O_{40}$; wherein X=P, Si, Ge, As or the like; and M=Mo, W or the like) heteropolyacid (phosphotungstic acid) is shown in FIG. 1. A tetrahedron $XO_4$ is present in the center of polyhedron made from units of octahedron $MO_6$, and a large amount of crystal water exists surrounding the structure thereof. The structure of the cluster acid is not particularly limited, and may be, for example, the Dawson type or the like, besides the above Keggin type.

The cluster acid catalyst is normally not in the crystalline state, but water which is coordinated to the cluster acid catalyst at the rate of constant amount is substituted as the word "crystal water", which is generally used. Also, crystal water generally means water which is contained when the cluster acid catalyst becomes in the crystal state. However, a water molecule which coordinates to the cluster acid catalyst in the pseudo-molten state in which each molecule of the cluster acid catalyst is released, or when the cluster acid catalyst is dissolved in the organic solvent (in this case, it is not in the dissolved state, but in the colloid state) is called as crystal water.

The cluster acid catalyst described above is in the solid state at ordinary temperature. However, it becomes in the pseudo-molten state, when the temperature is raised by heating. Thus, catalyst activity against the hydrolysis reaction of cellulose or hemicelluloses is exhibited. Herein, "pseudo-molten state" means a melted state in appearance, but it is not a completely-melted liquid state, which is the state close to colloid (sol) in which the cluster acid is dispersed in the liquid and exhibits flowability. The state has high viscosity and high density. Whether the cluster acid is in the pseudo-molten state or not can be visually confirmed. Alternatively, if the cluster acid in a pseudo-molten state is homogeneous, it can be confirmed by DSC (Differential Scanning Calorimetry) or the like.

As described above, the cluster acid exhibits high catalyst activity against the hydrolysis reaction of cellulose even at low temperature due to its high acid strength. In addition, since the diameter of the cluster acid is about 2 nm, mixing property with the plant fiber materials being raw materials is excellent, and the hydrolysis of cellulose can be efficiency promoted. Therefore, the hydrolysis of cellulose under mild condition can be performed; thereby, energy efficiency is high and environmental burden is reduced. Further, unlike the conventional hydrolysis method of cellulose using acid such as sulfuric acid, the method of the present invention using the cluster acid as a catalyst has high separation efficiency of saccharide and a catalyst; thereby they can be easily separated.

Furthermore, since the cluster acid becomes in the solid state depending on temperature, the cluster acid can be separated from the saccharide being the product. Therefore, the separated cluster acid can be collected and reutilized. Also, the cluster acid catalyst in the pseudo-molten state functions as a reaction solvent, thus, the amount of solvent as a reaction solvent can be significantly reduced compared with the conventional method. This means that the efficiency of the separation between the cluster acid and saccharide being the product and the collection of the cluster acid can be highly enhanced. That is, the present invention in which the cluster acid is used as the hydrolysis catalyst for cellulose can reduce cost and environmental burden.

It is preferable that the cluster acid catalyst and the plant fiber materials are preliminarily mixed and agitated before heating. Contact efficiency between the cluster acid and the plant fiber materials can be increased by mixing the cluster acid catalyst and the plant fiber materials to some extent before the cluster acid catalyst becomes in the pseudo-molten state.

As described above, since the cluster acid catalyst becomes in the pseudo-molten state and functions as the reaction solvent in the hydrolysis step, water, the organic solvent or the like as the reaction solvent may not be used in the hydrolysis step of the present invention depending on the form (size, state of fibers or the like) of the plant fiber materials, and the mixing ratio and the volume ratio of the cluster acid catalyst and the plant fiber materials.

Figure 2:
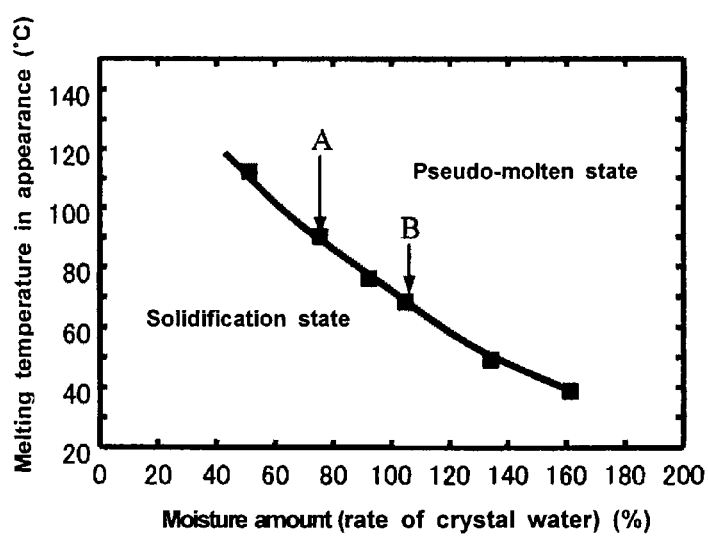
FIG. 2 is a graph showing the relationship between the rate of crystal water of a cluster acid catalyst and the melting temperature in appearance.

The pseudo-molten state of the cluster acid varies depending on temperature and the amount of crystal water contained in the cluster acid catalyst (see FIG. 2). Specifically, in the phosphotungstic acid being the cluster acid, if the amount of crystal water to be contained increases, the temperature which exhibits the pseudo-molten state lowers. That is, the cluster acid catalyst containing a large amount of crystal water exhibits the catalysis against the hydrolysis reaction of cellulose at lower temperature than that of the cluster acid catalyst containing relatively small amount of crystal water. This means that the cluster acid catalyst can be in the pseudo-molten state at desired temperature of hydrolysis reaction by controlling the amount of crystal water contained in the cluster acid catalyst in the reacting system of the hydrolysis step. For example, in the case of using phosphotungstic acid as the cluster acid catalyst, the temperature of hydrolysis reaction can be controlled in the range from 110° C. to 40° C. depending on the amount of crystal water of the cluster acid (see FIG. 2).

FIG. 2 shows the relationship between the rate of crystal water of a heteropolyacid (phosphotungstic acid) being a typical cluster acid catalyst and the temperature at which the pseudo-molten state begins to exhibit (melting temperature in appearance). The cluster acid catalyst is in the solidification state in the area under the curve and is in the pseudo-molten state in the area above the curve. In FIG. 2, a moisture amount (rate of crystal water) (%) means a value in which the standard amount of crystal water n (n=30) of the cluster acid (phosphotungstic acid) is referred to as 100%. The amount of crystal water can be specified by a thermal decomposition method (TG measurement), since the cluster acid catalyst has no component which is volatilized by thermal decomposition even at high temperature like 800° C.

Herein, the standard amount of crystal water means the amount (number of molecule) of crystal water contained in a molecule of cluster acid in the solid crystal state at room temperature, and varies depending on the kind of the cluster acid. For example, the amount of phosphotungstic acid is about 30 [$H_3[PW_{12}O_{40}].nH_2O$ (n≈30)], the amount of silicotungstic acid is about 24 [$H_4[SiW_{12}O_{40}].nH_2O$ (n≈24)], and the amount of phosphomolybdic acid is about 30 [$H_3[PMo_{12}O_{40}].nH_2O$ (n≈30)].

The amount of crystal water contained in the cluster acid catalyst can be adjusted by controlling the moisture amount present in the hydrolysis reacting system. Specifically, if the amount of crystal water of the cluster acid catalyst is required to be increased, that is, if the reaction temperature is required to be decreased, for example, water may be added to the reacting system of hydrolysis, such that water is added to a mixture containing the plant fiber materials and the cluster acid catalyst, or relative humidity of the atmosphere in the reacting system is increased. Thereby, the cluster acid incorporates water which is added as crystal water, and the melting temperature in appearance of the cluster acid catalyst decreases.

On the other hand, if the amount of crystal water of the cluster acid catalyst is required to be decreased, that is, if the reaction temperature is required to be increased, for example, the amount of crystal water of the cluster acid catalyst can be decreased, such that water is evaporated by heating the reacting system, or a desiccating agent is added to a mixture containing the plant fiber materials and the cluster acid catalyst. Thereby, the melting temperature in appearance of the cluster acid catalyst increases.

As described above, the amount of crystal water of the cluster acid can be easily controlled, and the temperature of the hydrolysis reaction of cellulose can be also easily adjusted by controlling the amount of the crystal water.

In the hydrolysis step, if the relative humidity of the reacting system is decreased by heating, it is preferable to keep the desired amount of crystal water of the cluster acid catalyst. Specifically, a method in which the atmosphere in the reacting system can be saturated vapor pressure at predetermined reaction temperature is used, for example, comprising preliminarily making the state of saturated vapor pressure at the temperature of hydrolysis reaction in a reaction container which is sealed, decreasing the temperature while keeping the sealed state to condense the vapor, and adding the condensed water to the plant fiber materials and the cluster acid catalyst.

In addition, if the plant fiber materials containing moisture are used, it is preferable to consider the moisture amount contained in the plant fiber materials as the moisture amount present in the reacting system. However, if the plant fiber materials in the dry state are used, it is not required to be considerated.

The decrease of the reaction temperature in the hydrolysis step has advantage of being able to improve energy efficiency.

Also, depending on the temperature of the hydrolysis step, the selectivity of the glucose production by hydrolysis of cellulose contained in the plant fiber materials varies. Generally, a reaction rate increases when the reaction temperature increases. For example, as reported in Japanese Patent Application No. 2007-115407, in the hydrolysis reaction of cellulose using phosphotungstic acid (melting temperature in appearance is about 40° C.; see FIG. 2) having the rate of crystal water 160%, the reaction rate R at 50° C. to 90° C. increases as the temperature is raised, and almost all cellulose reacts at around 80° C. On the other hand, glucose yield shows increasing tendency similarly as the reaction rate of cellulose at 50° C. to 60° C., but starts to decrease after peaking at 70° C. That is, while glucose is highly selectively produced at 50 to 60° C., reactions other than the glucose production, for example, production of other saccharide such as xylose and production of decomposition product proceed at 70 to 90° C.

Therefore, the reaction temperature of hydrolysis is an important element which influences the reaction rate of cellulose and the selectivity of the glucose production. It has already described that the temperature of hydrolysis reaction is preferably low from the viewpoint of the energy efficiency, but it is preferable to determine the temperature of the hydrolysis reaction in consideration of the reaction rate of cellulose and the selectivity of the glucose production. The reaction rate R of cellulose and the glucose yield can be calculated by the formula shown in Example 1.

In the hydrolysis step, (n−1) water molecules are required to decompose the cellulose, in which n glucoses are polymerized, into n glucoses. Therefore, if the total amount of moisture of the amount of crystal water required for the cluster acid catalyst to be in the pseudo-molten state at the reaction temperature, and moisture required for all charged cellulose to be hydrolyzed to the glucose is not present in the reacting system, the crystal water of the cluster acid catalyst is used for the hydrolysis of cellulose, and the amount of crystal water decreases. Thereby, the cluster acid becomes in the solidification state. That is, the mixture of the plant fiber materials and the cluster acid catalyst cannot be sufficiently mixed by the increase in the viscosity of the mixture besides the catalysis of the cluster acid catalyst against the hydrolysis of cellulose decreases.

Therefore, in the hydrolysis step, it is preferable to set the moisture amount in the reacting system as below to ensure the catalyst activity of the cluster acid catalyst at the reaction temperature and the function of the cluster acid catalyst as the reaction solvent, that is, to keep the pseudo-molten state of the cluster acid catalyst. That is, the preferable moisture amount in the reacting system is more than the total amount of (A) crystal water required for all cluster acid catalyst present in the reacting system to be in the pseudo-molten state at the reaction temperature in the hydrolysis step and (B) moisture required for all cellulose present in the reacting system to be hydrolyzed to the glucose.

Herein, (A) the crystal water required for all cluster acid catalyst to be in the pseudo-molten state includes the state in which the crystal water required for all cluster acid catalyst to be in the pseudo-molten state at the temperature in the hydrolysis step is included in a crystal lattice and the state that a portion of water molecule is present outside the crystal lattice.

In the hydrolysis step, if the cluster acid catalyst becomes in the solid state and the catalyst activity thereof decreases by decreasing moisture in the reacting system and also decreasing the amount of crystal water in the cluster acid catalyst, the decrease of the catalyst activity of the cluster acid catalyst can be prevented by increasing the hydrolysis temperature to make the cluster acid catalyst be in the pseudo-molten state.

Figure 3:
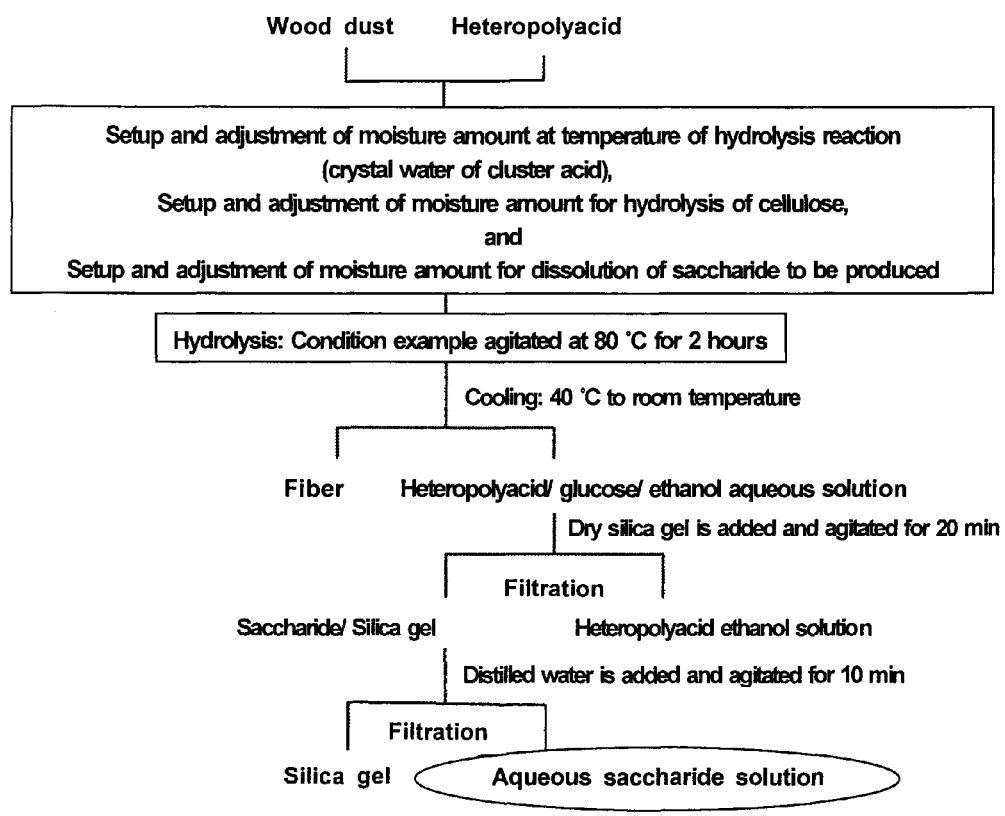
FIG. 3 is a chart showing an example of a hydrolysis step of cellulose to a step of collecting saccharide and heteropolyacid in a method of saccharification and separation of the present invention.

A portion of moisture in the aqueous saccharide solution which is made by dissolving the saccharide produced in the hydrolysis step may be added upon the hydrolysis step. Upon the hydrolysis step, by adding water, the saccharide produced by the hydrolysis of cellulose is dissolved before the saccharide is deposited and the crystal thereof is grown or aggregated, therefore, contamination of the cluster acid catalyst into the saccharide can be efficiently prevented. That is, the reacting system in the hydrolysis step contains (C) moisture required for dissolving at least a portion of saccharide to be produced, in addition to the total amount of (A) crystal water required for the cluster acid catalyst to be in the pseudo-molten state, and (B) moisture required for cellulose to be hydrolyzed to the glucose, thereby, a further purified saccharide can be produced and the collection rate of the cluster acid catalyst can be increased (see FIG. 3). Also, in the hydrolysis step, there is an advantage that stirring performance of the cluster acid catalyst and the plant fiber materials becomes high by adding (C) water in which at least a portion of saccharide to be produced is soluble. From the above viewpoint, it is preferable to add all moisture in the aqueous saccharide solution to the reacting system upon the hydrolysis step. Particularly, it is preferable to add moisture which can dissolve all the saccharide produced by the hydrolysis of the plant fiber materials upon the hydrolysis step.

On the other hand, since contact efficiency between the plant fiber materials and the cluster acid catalyst decreases by the amount of (C) water added, it is preferable to raise the reaction temperature to increase reactivity. Thereby, energy efficiency may decrease.

Therefore, it is preferable that the amount of water for dissolving the saccharide is the amount which can dissolve the saturated dissolution amount of saccharide produced by all charged plant fiber materials to make a saturated aqueous solution (hereinafter, it may be referred to as an amount of water for glucose saturated dissolution). The addition of excessive moisture has disadvantages of the decrease in separation efficiency in the following separation step and the decrease in concentration of the aqueous saccharide solution to be obtained, besides the decrease in energy efficiency in the hydrolysis step. From the above viewpoint, it is preferable that the amount of water for the aqueous saccharide solution is the amount of water for glucose saturated dissolution regardless of the timing of adding the water.

The amount of water which can dissolve all the saccharide produced from the plant fiber materials can be calculated by the solubility of saccharide such as glucose or xylose to be produced to water. However, as described above, the amount of water varies depending on the reaction temperature and time in the hydrolysis step, therefore, the temperature and time are necessary to be adjusted to make the condition to be approximately the same in every production batch. Thereby, the optimum amount of water to be added can be always maintained.

The condition of temperature in the hydrolysis step may be accordingly determined in consideration of several elements (for example, reaction selectivity, energy efficiency, a reaction rate of cellulose or the like) as described above. From the viewpoint of the balance of the energy efficiency, the reaction rate of cellulose and the glucose yield, the temperature is preferably 140° C. or less, more preferably 120° C. or less. Depending on the form of the plant fiber materials, even low temperature such as 100° C. or less can be included in the condition of temperature of the present invention. In that case, glucose can be produced by particularly high energy efficiency.

The pressure in the hydrolysis step is not particularly limited. The hydrolysis of cellulose can be efficiently promoted under the condition of mild pressure, from ordinary pressure (atmosphere pressure) to 1 MPa, since catalyst activity of the cluster acid catalyst against the hydrolysis reaction of cellulose is high.

The ratio of the plant fiber materials and the cluster acid catalyst varies from properties (for example, size or the like) of the plant fiber material to be used, and an agitating or mixing method in the hydrolysis step. Therefore, the ratio may be accordingly determined depending on performing conditions. The ratio is preferably in the range that weight ratio (the weight of cluster acid catalyst: the weight of plant fiber material) is from 1:1 to 4:1, and may be generally about 1:1.

Since the mixture containing the cluster acid catalyst and the plant fiber materials in the hydrolysis step has high viscosity, as the agitating method of the mixture, for example, a hot ball mill or the like is advantageously used. However, a general agitator may be used.

The time of the hydrolysis step is not particularly limited, and it may be accordingly set depending on the shape of the plant fiber materials to be used, the ratio of the plant fiber materials and the cluster acid catalyst, catalytic ability of the cluster acid catalyst, the reaction temperature and the reaction pressure.

After the hydrolysis, if the temperature of the reacting system is lowered, in the hydrolyzed mixture containing the residues (unreacted cellulose or the like) and the cluster acid catalyst, the saccharide produced in the hydrolysis step is contained as the aqueous saccharide solution in the case that water which dissolves the saccharide is present, or contained in the solid state by being deposited in the case that no water which dissolves the saccharide is present. A portion of the produced saccharide may be contained in the aqueous saccharide solution, and the rest of the saccharide may be contained in the above mixture in the solid state. The cluster acid catalyst has also water solubility, so that the cluster acid catalyst is also dissolved in water depending on water content of the mixture after the hydrolysis step.

Next, the separation step of separating the saccharide (mainly glucose) produced in the hydrolysis step from the cluster acid catalyst will be explained. The separation step comprises at least two steps: (1) a first separation step of separating a solid content containing residues from a liquid content containing an aqueous saccharide solution and a cluster acid organic solvent solution, and (2) a second separation step of separating a solid content containing the saccharide from the cluster acid organic solvent solution in the liquid content separated in the first separation step. Hereinafter, each separation step will be described in order.

The first separation step (1) is a step of separating a mixture containing an aqueous saccharide solution in which at least a portion of the saccharide produced in the hydrolysis step is dissolved, a cluster acid organic solvent solution in which the cluster acid catalyst is dissolved, and residues into a solid content containing the residues and a liquid content containing the aqueous saccharide solution and the cluster acid organic solvent solution.

As described above, if the saccharide in the solid state is contaminated by the cluster acid catalyst, and the saccharide with the cluster acid catalyst contaminated is separated from the cluster acid catalyst, purity of the saccharide to be obtained decreases and the collection rate of the cluster acid catalyst decreases.

Thus, by mixing the aqueous saccharide solution in which at least a portion of the produced saccharide, preferably all the produced saccharide, is dissolved in water, and the cluster acid organic solvent solution in which the cluster acid catalyst is dissolved in the organic solvent, contamination of the cluster acid catalyst into the saccharide (aqueous saccharide solution) is prevented, and separation efficiency of the cluster acid catalyst from the saccharide can be improved.

In the first separation step, the organic solvent in which the cluster acid catalyst is dissolved is not particularly limited as long as one has solubility property that the organic solvent is a good solvent for the cluster acid catalyst, but is a poor solvent for the saccharide.

Solubility of the saccharide to the organic solvent is preferably 0.6 g/100 ml or less, more preferably 0.06 g/100 ml or less, to efficiently deposit the saccharide. In this case, the solubility of the cluster acid catalyst to the organic solvent is preferably 20 g/100 ml or more, more preferably 40 g/100 ml or more, to efficiently deposit only saccharide.

Specific examples of the organic solvent include alcohols such as ethanol, methanol and n-propanol, and ethers such as diethyl ether and diisopropylether. Alcohols and ethers are suitably used. In particular, ethanol and diethyl ether are suitable. Since diethyl ether does not dissolve saccharide such as glucose or the like and has high solubility of the cluster acid, it is one of suitable solvents used in separation of the saccharide from the cluster acid catalyst. On the other hand, since ethanol hardly dissolves saccharide such as glucose or the like and has high solubility of the cluster acid catalyst, it is also one of suitable solvents. Diethyl ether has advantage in distilling compared with ethanol. Ethanol is more easily-obtainable than diethyl ether, and has advantage that the solubility of the cluster acid catalyst is extremely high.

The used amount of the organic solvent varies depending on the solubility property of the organic solvent to the saccharide and the cluster acid catalyst, and the moisture amount contained in the hydrolyzed mixture. Therefore, a suitable amount may be accordingly determined so that the cluster acid can be efficiently collected.

In the first separation step, as described above, at least a portion of the produced saccharide may be dissolved in the aqueous saccharide solution. It is preferable that all the produced saccharide is dissolved therein. That is, it is preferable that the amount of water which can dissolve all the saccharide produced by the cellulose contained in the plant fiber materials is contained in the aqueous saccharide solution.

In addition, the timing of adding the moisture which dissolves the saccharide in the first separation step is not limited. As described above, a portion or all moisture may be added in the hydrolysis step, or shortfall of or all moisture may be added in the first separation step.

Generally, the temperature in the separation step is preferably in the range from room temperature to 60° C., depending on the boiling point of the organic solvent or the like. Also, in the separation step, it is preferable that the aqueous saccharide solution and the cluster acid organic solvent solution are sufficiently agitated and mixed. Specific agitating method is not particularly limited, and a general method may be used. From the viewpoint of the collection efficiency of the cluster acid, the agitating method which can grind the solid content such as a ball mill is suitable.

In the first separation step, the liquid content containing the cluster acid organic solvent solution in which the cluster acid catalyst is dissolved by the organic solvent and the aqueous saccharide solution in which the saccharide is dissolved by water is separated from the solid content containing residues or the like of the plant fiber materials. Specific separation method is not particularly limited, and a general solid-liquid separation method such as filtration or decantation can be employed. The cluster acid catalyst has water solubility, so that a portion of the cluster acid catalyst may be dissolved in the aqueous saccharide solution.

In the case that a portion of the saccharide produced in the hydrolysis step is not dissolved and separated together with residues as the solid content, the solid content of residues or the like can be further separated from the aqueous saccharide solution by adding water to the solid content using water solubility of saccharide and water insolubility of the residues.

In the second separation step, water is selectively removed from the liquid content, which contains the aqueous saccharide solution and the cluster acid organic solvent solution separated in the first separation step, by a dehydration means capable of absorbing water through chemical absorption to deposit the saccharide, then the saccharide is separated from the cluster acid organic solvent solution in which the cluster acid catalyst is dissolved. The saccharide is not dissolved due to having extremely low solubility to the solvent of the cluster acid organic solvent solution, and if the liquid content is dehydrated, the saccharide is deposited. In the case that the cluster acid catalyst is dissolved in the aqueous saccharide solution, the cluster acid catalyst dissolved in the aqueous saccharide solution can dissolve in the organic solvent. Therefore, if the liquid content is dehydrated, the cluster acid catalyst can be dissolved in the cluster acid organic solvent solution and collected.

Herein, the dehydration means capable of absorbing water through chemical absorption is not particularly limited as long as the means can selectively absorb water through chemical absorption and remove water. For example, a method which can contact an ion-exchange resin, particularly an anion-exchange resin, with the liquid content containing the aqueous saccharide solution and the cluster acid organic solvent solution can be used, besides a method of adding the desiccating agent such as a silica gel or anhydrous calcium chloride. From the viewpoint of the amount of chemisorbed water, dehydration is preferably performed by adding the desiccating agent. In particular, the slice gel is preferably used as the desiccating agent.

The added amount of the desiccating agent may be accordingly determined as long as it can remove all moisture contained in the liquid content, since the added amount of the desiccating agent varies depending on dehydration ability of the desiccating agent by the chemical absorption. For example, if the silica gel is used as the desiccating agent, the amount of chemisorbed water by the silica gel can be calculated as follows.

That is, the silica gel in which the weight in the dry state is preliminarily measured is left in saturated water vapor at room temperature. Then, the pressure is reduced to about 0.1 torr by means of a vacuum pump under the condition that the temperature is maintained, and the silica gel is left therein. In this stage, it is considered that the silica gel is in the state that the pores are filled with distilled water by being left in saturated water vapor, and then physisorbed water having capillary condensed by pressure reduction is removed, thereby the state of the silica gel is changed that only chemically absorbed water is absorbed. The silica gel is left in saturated water vapor until pores of the silica gel is sufficiently filled with the distilled water, and the silica gel is left under reduced pressure until physisorbed water of the silica gel is removed.

Whether pores of the silica gel are filled with the distilled water or not, and whether the physisorbed water of the silica gel is removed or not, can be judged by measuring the weight of the silica gel. That is, it can be judged that pores of the silica gel are filled with the distilled water if the increase in weight due to water absorption stops and the weight stabilizes after the silica gel is left in saturated water vapor. It can be judged that physisorbed water of the silica gel is removed if the decrease in weight stops and the weight stabilizes after the silica gel is left under the condition of reduced pressure. As a rough guide, if the change ratio of the weight is less than 1%, it is considered that the dry and wet state of the silica gel is stabilized. It is considered that the difference between stabilized weight of the silica gel in which the physisorbed water is removed and the above dried weight is the amount of chemisorbed water by the silica gel.

Figure 4:
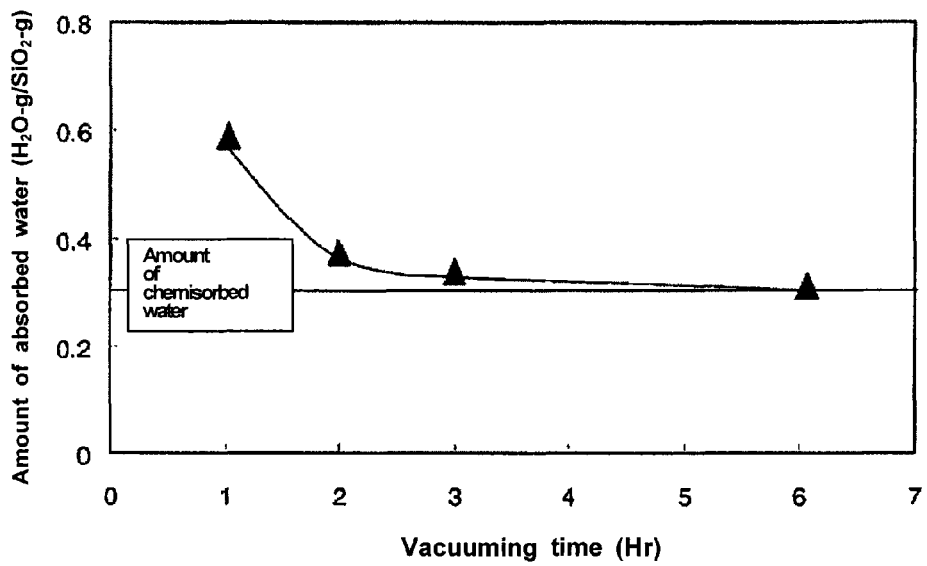
FIG. 4 is a graph showing a method of calculating the amount of chemisorbed water by silica gel.

For example, if the silica gel left in saturated water vapor is left under reduced pressure, the weight of the silica gel is reduced and the amount of absorbed water ($H_2O$-g/$SiO_2$-g) [(weight of hydrous silica gel)−(dried weight of silica gel)/(dried weight of silica gel)] decreases and stabilizes as a asymptotic line as shown in FIG. 4. The amount for stabilizing the absorbed water can be considered as the amount of chemisorbed water.

The added amount of the desiccating agent is not particularly limited if the aqueous saccharide solution can be dehydrated to deposit the saccharide as described above.

In the case of the silica gel, it is preferable to use more than the amount capable of absorbing 1.5 times of moisture to be removed through chemical absorption.

In the case of using silica gel as the desiccating agent and ethanol as the organic solvent, if excessive amount of silica gel is added, the cluster acid catalyst cannot be absorbed by the silica gel since the solubility of the cluster acid catalyst to ethanol is high. However, depending on the combination of the desiccating agent and the organic solvent, the cluster acid catalyst dissolved in the organic solvent may be absorbed by the desiccating agent by adding excessive amount of the desiccating agent. Therefore, there are cases that the excessive amount of the desiccating agent may not be used from the viewpoint of the collection rate of the cluster acid catalyst and purity of the saccharide.

Figure 5:
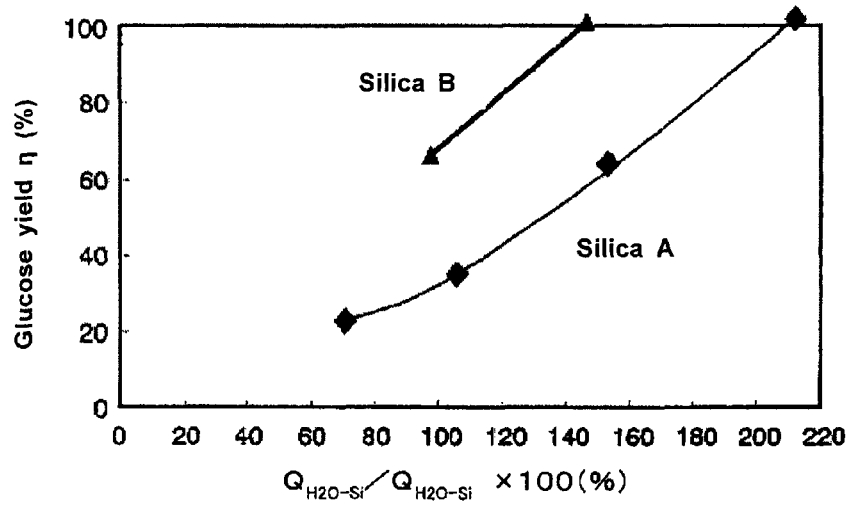
FIG. 5 is a graph showing the relationship between the used amount of silica gels A and B and glucose yield η in a reference experiment.

The inventors of the present invention have found that the pore volume of the silica gel influences the collection rate of glucose (the ratio of the glucose amount collected to the glucose amount actually produced) (see FIG. 5 and Reference experiment). That is, the inventors have found that the amount of chemisorbed water per unit weight is equivalent, but the collection rate of glucose of the silica gel having a large pore volume is higher compared with the silica gel having smaller pore volume. This suggests that the deposit of glucose by dehydration using the desiccating agent having a porous structure such as silica gel requires not only the amount of chemisorbed water by the desiccating agent, but also volume for depositing glucose on the surface of the desiccating agent.

The saccharide deposited by removing moisture by a dehydration means can be separated from the cluster acid organic solvent solution by a general solid-liquid separation method such as decantation or filtration. The solid content containing the separated saccharide can be obtained as the aqueous saccharide solution by washing using water. Specifically, in the case of dehydrating using the desiccating agent, the solid content containing the desiccating agent and the saccharide can be separated by a general method such as decantation or filtration, water is added to the separated solid content to wash, and the saccharide is collected by separating the aqueous saccharide solution from the solid content containing the desiccating agent (the third separation step).

On the other hand, the organic solvent solution containing the cluster acid catalyst can be separated into the cluster acid catalyst and the organic solvent by a general separation method such as distilling. As described above, the cluster acid catalyst can be separated from the products, residues or the like after being used as the hydrolysis catalyst for cellulose, and can be collected. Further, the cluster acid catalyst can be used again as the hydrolysis catalyst for the plant fiber materials containing cellulose.

According to the present invention, contamination of the cluster acid catalyst into the saccharide produced by hydrolyzing cellulose and collected is prevented and high-purity saccharide can be obtained. Specifically, the amount of cluster acid catalyst which contaminates into the saccharide can be less than 1%, further less than 0.1%, of the cluster acid catalyst used as the hydrolysis catalyst. Furthermore, according to the present invention, contamination of by-product like a caramel component such as organic acid, besides lignin, in the hydrolysis step into the saccharide can be prevented. It is known that if the cluster acid catalyst or the by-product contaminates into the saccharide, fermentation action of yeast is inhibited upon alcohol fermentation of the saccharide. However, alcohol fermentation efficiency can be improved using the saccharide obtained by saccharification and separation of the present invention.

Further, improvement of the collection rate of the cluster acid catalyst can be achieved by preventing the contamination of the cluster acid catalyst into the saccharide. Thereby, it is possible to increase the rate of reutilization of the cluster acid catalyst and to further efficiently perform saccharification and separation for the plant fiber materials.

EXAMPLES

Hereinafter, the quantity of D-(+)-glucose and D-(+)-xylose is determined by a high performance liquid chromatograph (HPCL) post-labelling fluorescent detection method. Also, cluster acid is identified and the quantity thereof is determined by ICP (Inductively Coupled Plasma).

Example 1

Distilled water was preliminarily charged in a sealed container, and the temperature thereof was raised up to predetermined reaction temperature (70° C.) to make the inside of the container be in the state of saturated vapor pressure, then water vapor attached on the inner surface of the container.

Next, 1 kg of phosphotungstic acid in which the amount of crystal water was preliminarily measured, and 0.5 kg (dry weight) of cellulose were mixed and charged into the sealed container. Further, distilled water (55.6 g), which was shortfall (except the above moisture of saturated vapor pressure at 70° C.) from the total amount of moisture (158 g) required for phosphotungstic acid to be in the pseudo-molten state at the reaction temperature of 60° C. and moisture (55.6 g) required for cellulose to be glucose by hydrolysis, and water (55.6 g) which dissolves glucose produced upon all 0.5 kg of cellulose becomes glucose as the amount of saturated dissolution, were added.

Then, when the inside of the sealed container was heated, the phosphotungstic acid became in the pseudo-molten state around 50° C., and the state in which the mixture in the container was able to be agitated was made at around 60° C. It was further heated to 70° C. and kept agitating for 1.5 hours.

After that, heating was stopped, and it was cooled to around 40° C. Then, 6 L of ethanol was added and agitated for 60 minutes. Thereby, the phosphotungstic acid and saccharide were completely dissolved. Residues (fibers: unreacted celluloses) were precipitated.

Next, the precipitate was filtered, and a silica gel was added to the obtained filtrate and agitated for 30 minutes. The added amount of the silica gel was the amount capable of absorbing 1.5 times of water (55.6 g of water for glucose saturated dissolution) for dissolving the glucose through the chemical absorption. The amount of chemisorbed water by the silica gel was referred to as a value calculated by the following method.

<Amount of Chemisorbed Water by Silica Gel>

The silica gel in which the dry weight was preliminarily measured was left in saturated water vapor at room temperature for 1 hour. Then, the pressure was reduced to about 0.1 torr by means of a vacuum pump and the silica gel was left therein. The decrease in weight of the silica gel was completed for approximately 6 hours (see FIG. 4). The silica gel was taken out and the weight (stable weight) thereof was measured, and the difference between the stable weight and the dry weight [(stable weight)-(dry weight)] was divided by the dry weight of the silica gel, then the resultant value was referred to as an amount of chemisorbed water per unit weight by the silica gel.

Subsequently, the solid content containing the silica gel and the saccharide deposited due to the dehydration of the silica gel was separated from the liquid content containing phosphotungstic acid and ethanol by filtration. The obtained solid content was washed by 1,000 vol % water, and further filtered. Thereby, the aqueous saccharide solution was separated from the silica gel.

Separately, the ethanol solution was distilled and ethanol and phosphotungstic acid were separated.

The following items were measured for Example 1. The results are shown in Table 1.

The following items were calculated by the following formulae. Also, the residual amount of the phosphotungstic acid in the aqueous saccharide solution was calculated by measuring the amount of phosphorus and tungsten in the aqueous saccharide solution by ICP measurement (n=4) as a mean value.

Cellulose reaction rate R (%): the ratio of cellulose actually hydrolyzed to the charged amount of cellulose Glucose yield η (%): the ratio of glucose actually collected to the amount of theoretical glucose production which is produced when all charged cellulose becomes glucose Phosphotungstic acid residual ratio r (%) in an aqueous saccharide solution: the ratio of phosphotungstic acid remained in an aqueous saccharide solution to the charged amount of phosphotungstic acid Glucose collection rate C (%): the ratio of glucose actually collected to the amount of theoretical glucose production which is produced when all cellulose actually hydrolyzed becomes glucose $$\text{Reaction rate } R = \frac{(QCt - QCr)}{QCt} \times 100 \quad \text{[Mathematical formula 1]}$$

QCt: Charged amount of cellulose
QCr: Amount of unreacted cellulose $$\text{Yield } \eta = \frac{QG}{QGt} \times 100$$

QGt: Amount of theoretical glucose produced by hydrolyzing all charged cellulose
QG: Amount of glucose actually collected $$\text{Residual ratio } r = \frac{QP}{QPt} \times 100$$

QPt: Charged amount of phosphotungstic acid
QP: Amount of phosphotungstic acid in sugar aqueous solution $$\text{Collection rate } C = \frac{QG}{QGr} \times 100$$

QGr: Amount of theoretical glucose produced by hydrolyzing all cellulose [(QCt)−(QCr)] actually hydrolyzed
QG: Amount of glucose actually collected

TABLE 1

|  | Example 1 | Example 2 | Comparative example 1 | Comparative example 2 |
|---|---|---|---|---|
| Reaction rate R (%) | 64 | 65 | 67 | 67 |
| Yield η (%) | 59 | 45 | 60 | 58 |
| Residual ratio r (%) | 0.05 | 0.04 | 8.3 | 4.2 |
| Collection rate C (%) | 98.6 | 67.5 | 99.7 | 98.5 |

Example 2

An aqueous saccharide solution was obtained by hydrolyzing cellulose similarly as in Example 1 except that the added amount of the silica gel was changed to the amount capable of absorbing 1.5 times of water (55.6 g) for dissolving the glucose through the physical absorption and the chemical absorption. The amount of physisorbed and chemisorbed water by the silica gel was calculated by the following method. The reaction rate R, glucose yield η, residual ratio r of phosphotungstic acid and glucose collection rate C in Example 2 are shown in Table 1.

<Amount of Chemisorbed and Physisorbed Water by Silica Gel>

The silica gel in which the dry weight was preliminarily measured was left in saturated water vapor at room temperature for 1 hour. Then, the weight (water absorption weight) was measured and the difference between the water absorption weight and the dry weight [(water absorption weight)−(dry weight)] was divided by the dry weight of the silica gel, and the resultant value was referred to as an amount of chemisorbed and physisorbed water per unit weight by the silica gel.

Comparative Example 1

Distilled water was preliminarily charged in a sealed container, and the temperature thereof was raised up to the predetermined reaction temperature (60° C.) to make the inside of the container be in the state of saturated vapor pressure, then water vapor attached on the inner surface of the container.

Next, 1 kg of phosphotungstic acid in which the amount of crystal water was preliminarily measured, and 0.5 kg (dry weight) of cellulose were mixed and charged into the sealed container. Further, distilled water (55.6 g), which was shortfall (except the above moisture of saturated vapor pressure at 70° C.) from the total amount of moisture (158 g) required for the phosphotungstic acid to be in the pseudo-molten state at the reaction temperature 60° C., was added.

Then, when the inside of the sealed container was heated, the phosphotungstic acid became in the pseudo-molten state around 40° C., and the state in which the mixture in the container was able to be agitated was made at around 50° C. It was further heated to 60° C. and kept agitating for 1.5 hours at 60° C.

After that, heating was stopped, and it was cooled to around 40° C. Then, 6 L of ethanol was added and agitated for 60 minutes to dissolve the phosphotungstic acid in the ethanol. Thereby, the saccharide was precipitated together with fibers (unreacted celluloses).

Next, the precipitate was filtered, and 1 L of the distilled water was added to the separated precipitate and agitated for 15 minutes, then the saccharide was dissolved.

It was further filtered to separate the aqueous saccharide solution from the fibers.

Separately, the ethanol solution which was collected as the filtrate was distilled, and ethanol and phosphotungstic acid were separated.

The reaction rate R, glucose yield η, residual ratio r of phosphotungstic acid and glucose collection rate C in Comparative example 1 are shown in Table 1.

Comparative Example 2

An aqueous saccharide solution was obtained by hydrolyzing the cellulose similarly as in Comparative example 1 except that after the hydrolysis step of the cellulose, the solid content obtained after reaction (the produced saccharide, the phosphotungstic acid and residues such as the unreacted cellulose) which was cooled to around 40° C. was ground by means of a grinder mill, then 6 L of ethanol was added to the ground product to carry out the separation step.

The reaction rate R, glucose yield η, residual ratio r of phosphotungstic acid and glucose collection rate C in Comparative example 2 are shown in Table 1.

<Results>

As shown in Table 1, 8.3% of phosphotungstic acid (cluster acid) remained in the obtained aqueous saccharide solution in Comparative example 1, and 4.2% of phosphotungstic acid (cluster acid) remained in the obtained aqueous saccharide solution in Comparative example 2.

On the other hand, in Examples 1 and 2, in which saccharification and separation for cellulose was performed by the method of saccharification and separation of the present invention, the residual ratio r in the aqueous saccharide solution of the phosphotungstic acid was 0.05% in Example 1, and was 0.04% in Example 2. Thus, in Examples 1 and 2, the residual ratio r was able to be largely decreased compared with those of Comparative examples 1 and 2. That is, according to the method of saccharification and separation of the present invention, it can be known that it is possible to produce a high-purity aqueous saccharide solution and to increase the rate of reutilization of the cluster acid catalyst by large increase in the collection rate of the cluster acid catalyst.

Further, while the aqueous saccharide solutions obtained in Comparative examples 1 and 2 were slightly tinged with black, the aqueous saccharide solutions obtained in Examples 1 and 2 were highly transparent. It is considered that this is because the by-product in the hydrolysis step, for example, a caramel component containing organic acid generated by over reaction, and lignin were dissolved in the ethanol solution of phosphotungstic acid in Examples 1 and 2.

In Comparative example 2, the solubility of the phosphotungstic acid to ethanol was able to be increased by increasing contact opportunity between the phosphotungstic acid, which was contaminated into the saccharide in the solid state produced and deposited in the hydrolysis step, and ethanol by the grinding treatment. Thereby, the residual ratio r of the phosphotungstic acid was able to be reduced by about half that of Comparative example 1.

Also, comparing Example 1 and Example 2, there is not much difference between values of the residual ratio r of the phosphotungstic acid. However, while the glucose yield η was 59% and the collection rate C was 98.6% in Example 1, the glucose yield η was 45% and the collection rate C was 67.5% in Example 2, that is, both yield η and collection rate C decreased in Example 2. This is estimated that the added amount of the silica gel being a dehydrating agent was calculated including the amount of physisorbed water by the silica gel in Example 2, so that the moisture amount capable for the silica gel of added amount to absorb through chemical absorption was not sufficient, thereby not all amount of water for glucose saturated dissolution were able to be absorbed. That is, it is considered that the dehydrating action by the silica gel was insufficient to deposit the produced glucose, and the aqueous saccharide solution remained in the phosphotungstic acid ethanol solution. The result shows that in the case of using a silica gel as a desiccating agent, physical absorptive capacity of the silica gel is not effective to the dehydrating action, and glucose can be efficiently collected by calculating the used amount of the silica gel only from chemisorbed amount by the silica gel.

[Reference Experiment]

Similarly as in Example 1, the saccharification and separation for cellulose was performed respectively using silica gel A (product name: 923 AR; manufactured by FUJI SILYSIA CHEMICAL LTD.), or silica gel B (product name: D-350-120A; manufactured by AGG Si-Tech Co., Ltd.). These silica gels have different specific surface area and pore volume shown in Table 2. The amounts of chemisorbed water by the silica gels A and B which were calculated similarly as in Example 1 are respectively shown in Table 2.

TABLE 2

|  | Specific surface area (m$^2$/g) | Pore volume (ml/g) | Amount of chemisorbed water (g-H$_2$O/g-SiO$_2$) |
| --- | --- | --- | --- |
| Silica A | 500 | 0.32 | 0.329 |
| Silica B | 412 | 1.23 | 0.342 |

By changing the used amount of each silica gel (see FIG. 5), the saccharification and separation for cellulose was performed and the glucose yield η was calculated. Also, [($Q_{H2O\text{-}Si}$/$Q_{H2O\text{-}G}$)×100(%)], which is the ratio of the absorbed amount ($Q_{H2O\text{-}Si}$) of water through the chemical absorption by used silica gel with respect to the amount ($Q_{H2O\text{-}G}$) of water for saturated dissolution of the glucose produced when all charged cellulose becomes glucose was calculated. The glucose yield η to ($Q_{H2O\text{-}Si}$/$Q_{H2O\text{-}G}$)×100(%) is shown in FIG. 5.

As shown in FIG. 5, even if the values of ($Q_{H2O\text{-}Si}$/$Q_{H2O\text{-}G}$)×100 in silica gels A and B are equivalent, that is, if the amounts of chemisorbed water by added silica gel in silica gels A and B are equivalent, the glucose yield η in silica gel B was higher than that of silica gel A. It means that the silica gel A was able to deposit less amount of glucose than the silica gel B, even if such amounts of gels were used that the amount of chemisorbed water by the silica gel A and that of silica gel B were equivalent. In addition, the used amount of the silica gel A was required to be large to make the glucose yield be 100% since the curve which shows the relationship between ($Q_{H2O\text{-}Si}$/$Q_{H2O\text{-}G}$) and the glucose yield η shown in FIG. 5 has a convex shape downward. On the other hand, it was possible for the silica gel B having a larger pore volume compared with that of the silica gel A to deposit a large amount of glucose using less amount of silica gel than that of the silica gel A.

The result shows that not only the dehydrating action through the chemical absorption of the desiccating agent, but also the pore volume of the desiccating agent require for depositing the glucose by the dehydrating action is important for the deposit of glucose by dehydration using the desiccating agent having the porous structure such as the silica gel.

The invention claimed is:

1. A method of saccharification and separation for plant fiber materials, comprising:
    a hydrolysis step of hydrolyzing cellulose contained in the plant fiber materials using a cluster acid catalyst in a pseudo-molten state to produce saccharide, most of which is glucose;
    a first separation step of separating a mixture containing an aqueous saccharide solution in which at least a portion of the saccharide produced in the hydrolysis step is dissolved, a cluster acid organic solvent solution in which the cluster acid catalyst is dissolved, and residues into a solid content containing the residues and a liquid content containing the aqueous saccharide solution and the cluster acid organic solvent solution; and
    a second separation step of dehydrating the liquid content, which contains the aqueous saccharide solution and the cluster acid organic solvent solution and is separated in the first separation step, by a dehydration means capable of absorbing water through chemical absorption to deposit the saccharide in the aqueous saccharide solution, and separating a solid content containing the saccharide from a liquid content containing the cluster acid catalyst and the organic solvent.

2. The method of saccharification and separation for plant fiber materials according to claim 1, wherein, in the hydrolysis step, a moisture amount in a reacting system is a total amount or more of (1) crystal water required for all the cluster acid catalyst in the reacting system to be in the pseudo-molten state under temperature condition of the hydrolysis step, and (2) water required for all the cellulose in the reacting system to be hydrolyzed to the glucose.

3. The method of saccharification and separation for plant fiber materials according to claim 1, wherein all the saccharide produced from the cellulose is dissolved in the aqueous saccharide solution.

4. The method of saccharification and separation for plant fiber materials according to claim 1, wherein at least a portion of water constituting the aqueous saccharide solution is contained in the reacting system of the hydrolysis step.

5. The method of saccharification and separation for plant fiber materials according to claim 4, wherein all water constituting the aqueous saccharide solution is contained in the reacting system in the hydrolysis step.

6. The method of saccharification and separation for plant fiber materials according to claim 1, wherein the dehydration means is addition of a desiccating agent.

7. The method of saccharification and separation for plant fiber materials according to claim 6, wherein silica gel is used as the desiccating agent.

8. The method of saccharification and separation for plant fiber materials according to claim 6, wherein after the solid content containing the saccharide and the desiccating agent is separated from the liquid content containing the cluster acid catalyst and the organic solvent in the second separation step, the method of saccharification and separation further comprises a third separation step of adding water to the solid content separated in the second separation step, and separating an aqueous saccharide solution in which the saccharide in the solid content is dissolved in the water from the desiccating agent.

9. The method of saccharification and separation for plant fiber materials according to claim 1, wherein the hydrolysis step is performed at 140° C. or less under ordinary pressure to 1 MPa.

10. The method of saccharification and separation for plant fiber materials according to claim 1, wherein the cluster acid catalyst is heteropolyacid.

11. The method of saccharification and separation for plant fiber materials according to claim 1, wherein solubility of the saccharide with respect to the organic solvent is 0.6 g/100 ml or less.

12. The method of saccharification and separation for plant fiber materials according to claim 1, wherein at least one kind selected from ethers and alcohols is used as the organic solvent.

* * * * *